United States Patent Office

2,994,672
Patented Aug. 1, 1961

2,994,672
ADHESIVE COMPRISING AQUEOUS DISPERSION OF WATER SOLUBLE POLYMER AND PHENOL-ISOCYANATE ADDUCT, CELLULOSIC STRUCTURE COATED WITH SAME AND PROCESS OF PREPARING SAME
James D. Geerdes, Richmond, Va., assignor to E. I. du Pont de Nemours and Company, Wilmington, Del., a corporation of Delaware
No Drawing. Filed Nov. 6, 1957, Ser. No. 694,749
16 Claims. (Cl. 260—17)

This invention relates to improvements in the bonding of cellulosic reinforcing structures to elastomers and other materials and particularly to new and useful adhesive coatings for cellulosic structures which are used in the reinforcement of rubber products.

This application is a continuation-in-part of my copending application, U.S. application Serial No. 616,363, filed October 17, 1956, now abandoned.

The use of rayon and other synthetic fibers as reinforcing elements in vulcanized rubber structures has presented troublesome problems in suitably bonding these reinforcing elements to the rubber. This is due to the fact that these synthetic fibers do not adhere to rubber adequately without special treatments. The bonding problem has been solved to the extent that satisfactory tires reinforced with artificial fibers have been produced. This has been accomplished by applying an adhesive composition to the cords which are used for the reinforcement of tires.

Fabric reinforced conveyor belts are made by plying together a number of layers of woven fabric and rubber and bonding the rubber to the fabric so that each layer of fabric, as well as the entire belt, is surrounded by rubber bonded to fabric. When a cotton fabric is used an acceptable belt results from this procedure. However, a belt made with a rayon fabric is unacceptable due to inadequate fabric to rubber adhesion. While attempts have been made to provide satisfactory adhesive compositions which could be applied to rayon, the problem has not been satisfactorily solved as evidenced by the fact that yarn or fabric treated with the compositions of the prior art have been accepted for use in conveyor belts to only a very limited degree in spite of the advantages of rayon in strength and other properties as compared to cotton. Prior art compositions have either not provided adequate adhesion or have been too expensive or have proven impractical in other respects. Latex-resin dips of the type used on tire cords have been used only to a limited degree in conveyor belt manufacture, because the dip is expensive, the treatment is not always effective and the wet adhesion, i.e., adhesion after exposure to water, obtained by this method is not satisfactory. Since many belts and other valuable products are used under conditions where they are either wet or are exposed to appreciable moisture, wet adhesion is an important consideration.

An adhesive coating which could be readily applied to rayon yarn in the course of the normal processing of the yarn in the rayon plant to give a satisfactory level of dry and wet adhesion would obviously be highly desirable. Unfortunately, many of the prior art compositions which provide adequate dry adhesion cannot be applied to the yarn before weaving since these adhesive coatings are very tacky and yarns coated with them cannot be woven into the relatively tight fabric used in conveyor belts. In addition, these compositions do not provide adequate wet adhesion. Other less viscous compositions which have been proposed do not provide satisfactory wet adhesion.

It is an object of this invention to provide a new and useful adhesive coated cellulosic reinforcing structure and a process for its production. Another object is to provide an improved adhesive coated rayon yarn which may be woven into a reinforcing fabric without difficulty. Another object is to provide an adhesive coated rayon yarn which gives a greatly improved level of wet adhesion. Other objects will become apparent from the examples and description that follow.

The above objects are accomplished by applying to the cellulosic structure an aqueous dispersion containing a water-soluble organic polymer and the reaction product, $R(HNCOOC_6H_5)_n$, of a polyisocyanate, $R(NCO)_n$, and phenol, wherein R is aliphatic, substituted aliphatic, aromatic or substituted aromatic and $n$ is at least 2 and drying the resulting coated structure. Preferably the adhesive composition also contains a rubber latex.

The adhesive coated regenerated cellulose structures of this invention may be bonded to rubber in the customary manner by the use of heat and pressure to form reinforced articles in which the adhesion of the cellulose to rubber is outstanding as compared to untreated material and is generally superior to the adhesion obtained with cotton. Cotton structures such as yarns or fabrics may likewise be coated with the adhesive composition of this invention to give greatly improved adhesion.

Adhesive coated yarns prepared by the process of this invention have the advantage that they may be easily processed into woven or twisted structures. This makes it possible to apply the adhesive composition during the normal processing of the yarn in the rayon plant in an economical manner. Another outstanding characteristic of the adhesive coated yarns of this invention is the greatly improved level of wet adhesion as compared to results obtained with prior art coatings. In addition, fabrics from these adhesive coated yarns may be dipped with any of the resin-latex dips which are commercially used for dipping cords or fabrics to obtain still higher levels of dry and wet adhesion.

In the following examples the isocyanate adducts having the formula $R(HNCOOC_6H_5)_n$ are prepared in the following manner: The phenol is dissolved in an equal weight of benzene. In cases where the phenol contains water in small amounts, additional benzene is added and distilled off to remove the water. To the residual solution is added the isocyanate dissolved in an equal weight of benzene. A few drops of triethylamine or a small amount of metallic sodium is added and the solution refluxed for 4 to 6 hours if required. If the isocyanate adduct separates at the end of the reaction period, it is filtered off, washed with benzene and dried. If the adduct is soluble or partially soluble, the benzene is distilled off to recover the adduct which is then recrystallized or reprecipitated, if necessary, to obtain a pure product. The relative amounts of the two reactants are adjusted to give a slight excess of the phenol over that required to react with all of the available isocyanate groups.

EXAMPLE I

An aqueous dispersion of an isocyanate adduct of the formula $R(HNCOOC_6H_5)_n$ and an organic, water-soluble polymer was prepared by grinding 20 grams of the dry crystalline adduct and 1.0 gram of commercial-grade sodium carboxymethyl cellulose (CMC) in 1100 grams of sand containing 268 grams of water for 40 minutes according to the process of Hochberg U.S. 2,581,414. Additional water was then added to give the desired final concentration of 2.0% adduct and 0.1% CMC and the sand filtered out. Dry "Super Cordura" high tenacity rayon yarn of 1650 denier and 1100 filaments was treated on a slashing machine with the aqueous dispersion prepared as described above. The yarn was passed through the dispersion, contained in the slasher pan at a temperature of 25 to 30° C., for a distance of 30 inches at a speed of 50 yards per minute. Yarn was then passed through the slashing machine in the usual manner where it was stretched 3% and dried, the temperature of the slasher drying rolls being 135° C. No additional finish was applied to the yarn. The yarn was then woven into a 26 ounce per square yard plain weave fabric of the type used in conveyor belt construction. The fabric had 17 4-ply ends in the warp and 14 3-ply ends in the filling. Three 5 x 10 inch sections of the fabric were dried to less than 1% moisture and sandwiched in alternate layers between 5 x 8 inch sections of unvulcanized rubber sheet. The rubber stock had the following composition.

|  | Parts |
|---|---|
| Smoked sheet | 100 |
| Zinc oxide | 15 |
| Stearic acid | 1 |
| Pine tar | 1 |
| "Neozone D"[1] (phenyl-beta-naphthylamine) | 1 |
| 2-mercaptobenzothiazol | 1 |
| Sulfur | 2.5 |
| "Philblack A"[2] (furnace carbon black) | 25 |

[1] Trade name of E. I. du Pont de Nemours & Company.
[2] Trade name of Phillips Chemical Company.

The sample was then placed in a hot press at a pressure of 200 p.s.i. and heated at 150° C. for 50 minutes. The sample was then removed, allowed to come to room temperature and cut lengthwise into 1-inch strips. The force in pounds required to pull apart adjacent fabric strips in the one inch sample was determined by means of a commercial Instron tester. Results obtained with three different compounds are shown in Table I below. Also shown for comparison are the results obtained when the CMC is omitted from the adhesive formulation. Results are also shown for CMC alone, untreated rayon and untreated cotton fabric. In addition, the adhesion value obtained on a 1-inch strip of commercial, cotton-reinforced conveyor belt is shown. The reason for the higher value obtained on the conveyor belt as compared to the cotton fabric test sample, prepared as described above, is that in fabricating a conveyor belt the cotton fabric is calendered to increase the adhesion of the rubber to the cotton. Surprisingly, the rayon samples treated with the adhesive formulation of this invention give uncalendered adhesion values substantially equivalent to or superior to that obtained on the calendered cotton reinforced conveyor belt.

The amount of adhesive picked up by the yarns of this invention was determined on the dry yarn by extracting 20 gram samples of the yarn in a Soxhlet extraction apparatus as follows: the yarn was first extracted with carbon tetrachloride for 3 hours after which the carbon tetrachloride was evaporated and the extracted material dried in an oven at 100 to 110° C. for 4 hours and weighed. The yarn, after drying in the air to remove most of the remaining carbon tetrachloride, was then extracted with alcohol for 3 hours and the weight of extracted material determined as in the case of the carbon tetrachloride extract. The yarn was again air dried to remove most of the alcohol remaining in it and extracted with water for 16 hours after which the water was evaporated and the extracted material dried and weighed. The yarn was then dried in an oven at 100–110° C. and weighed to determine the dry weight of yarn present. The total weight of extracted material from the three extractions was used in calculating the pickup of adhesive. The pickup of adhesive on the yarns of this invention is indicated in Table I below.

Table I

|  | Adhesion, lbs. | Adhesive Pickup, Percent |
|---|---|---|
| Adduct A | 8 |  |
| Adduct A+CMC | 19 | 1.3 |
| Adduct B | 6 |  |
| Adduct B+CMC | 15 | 0.85 |
| CMC, 0.1% | 6 |  |
| CMC, 1.0% | 7 |  |
| Untreated Rayon | 3 |  |
| Cotton (Conveyor belt fabric) | 11 |  |
| Conveyor belt (Calendered cotton) | 17 |  |

Adduct A—Bis-phenol adduct of diphenylmethane-4,4'-diisocyanate.
Adduct B—Phenol adduct of hexamethylene diisocyanate.

EXAMPLE II

Aqueous dispersions containing 2.0% isocyanate adduct and 0.1% CMC were prepared as described in Example I. A 40% aqueous dispersion of latex was added to the adduct-CMC mixture during the final dilution step to give a concentration of 0.4% latex solids in the dispersion. This dispersion was applied to yarn and the yarn woven into fabric and tested as described in Example I.

For comparison, dispersions were prepared as described above except that the CMC was omitted. Since, in the absence of CMC the dispersion was unstable, 0.04% of a commercial dispersing agent, sodium lauryl sulfate, sold by E. I. du Pont de Nemours & Company under the trade name "Duponol C" was added. Results of these tests are shown in Table II below. The pickup of adhesive on the yarns of this invention was determined as described in Example I and the values obtained are shown below.

Table II

|  | Adhesion, lbs. | Adhesive Pickup, Percent |
|---|---|---|
| Adduct A+Latex A | 11 |  |
| Adduct A+Latex A+CMC | 21 | 1.8 |
| Adduct A+Latex B | 14 |  |
| Adduct A+Latex B+CMC | 37 | 1.9 |
| Adduct B+Latex A | 10 |  |
| Adduct B+Latex A+CMC | 30 | 1.9 |
| Adduct C+Latex C | 12 |  |
| Adduct C+Latex C+CMC | 26 | 1.8 |

Adduct C—Phenol adduct of toluene diisocyanate.
Latex A—Natural latex.
Latex B—"Gen Tac" latex (see note A)—a butadiene/styrene/vinylpyridine latex.
Latex C—"Hycar" 2508 (see note B)—a butadiene/vinyl pyridine/styrene latex.

Note A.—Trade name of General Tire and Rubber Company.
Note B.—Trade name of B. F. Goodrich Chemical Company.

EXAMPLE III

Aqueous dispersions containing 2.0% isocyanate adduct, 0.1% CMC and 0.4% latex B solids were prepared as described in Example II. These dispersions were applied to yarn and the yarn woven into fabric and tested as described in Example I. Wet adhesion values were obtained by soaking the strips for 7 days in water at 25° C. and then carrying out the adhesion determination in the same manner as in the dry adhesion tests. Results of these tests are shown in Table III below. Adducts A, B, and C are within the scope of the present invention while adducts D, E, F, G, and H, shown for comparison, are outside the scope of the invention.

Table III

| | Adhesion, lbs. | | Percent loss |
|---|---|---|---|
| | Dry | Wet | |
| Adduct A | 32 | 22 | 31 |
| Adduct B | 21 | 20 | 5 |
| Adduct C | 23 | 21 | 9 |
| Average | 25 | 21 | 15 |
| Adduct D | 32 | 11 | 66 |
| Adduct E | 40 | 9 | 78 |
| Adduct F | 29 | 6 | 79 |
| Adduct G | 24 | 5 | 79 |
| Adduct H | 17 | 5 | 71 |
| Average | 28 | 7 | 75 |

Adduct D—Acetoacetic ester adduct of toluene diisocyanate.
Adduct E—Acetoacetic ester adduct of diphenylmethane-4,4'-diisocyanate.
Adduct F—Malonic ester adduct of diphenylmethane-4,4'-diisocyanate.
Adduct G—Acetoxime adduct of diphenylmethane-4,4'-diisocyanate.
Adduct H—Acetamide adduct of diphenylmethane-4,4'-diisocyanate.

EXAMPLE IV

This example illustrates the effectiveness of additional latexes in the process of this invention. Aqueous dispersions containing 2% of adduct A, 0.1% CMC and 0.4% of the latex were prepared as described in Example II. Then dispersions were applied to yarn and adhesion tests carried out as described in Example II. Results of these tests are shown in Table IV below.

Table IV

| Latex | Adhesion, lbs. |
|---|---|
| Type 735 Neoprene | 30 |
| Type 570 Neoprene | 29 |
| GR-S 2101 (Butadiene/Styrene) | 30 |
| Polyplex (Butadiene/vinyl pyridine/Styrene) | 32 |

EXAMPLE V

This example illustrates the effectiveness of additional water soluble organic polymers in the process of this invention. Table V below shows adhesion values, obtained following the procedures of Examples I and II, when various of these polymers were used in conjunction with isocyanate adduct A and with latex added. In the experiment with sodium alginate, 1.0% adduct A and 0.2% latex B were used. In each of the other cases 2% of adduct A was used and in those cases where latex was added, 0.4% of "Hycar"[1] 2508 (Latex C) was used.

Table V

| Water Soluble Polymer | Adhesion, lbs. |
|---|---|
| 0.1% sodium alginate+latex | 27 |
| 0.1% polyacrylamide | 15 |
| 0.1% polyacrylamide+latex | 30 |
| 0.5% diethyl aminoethyl methacrylate polymer | 20 |
| 0.5% diethylaminoethyl methacrylate polymer+latex | 25 |
| 0.1% sodium cellulose sulfate | 21 |
| 0.5% sodium cellulose sulfate | 14 |
| 0.5% sodium cellulose sulfate+latex | 26 |
| 0.1% sodium polyacrylate | 19 |
| 0.1% sodium polyacrylate+latex | 29 |

EXAMPLE VI

Five by ten inch sections of rayon fabric of the construction given in Example I were dipped in an aqueous dispersion containing 2% adduct A, 0.1% CMC and 0.3% "Hycar"[1] 2508 latex prepared as described in Example I. The fabric sections were immersed for one minute, then passed through a roller type wringer to remove excess liquid and dried in an oven at 105° C. Test samples were prepared and the adhesion measured as described in Example I. For comparison rayon yarn, of the type used to weave the fabric, was first treated with the above adhesive formulation, woven into fabric and tested following the procedure described in Example I. Results of these tests are shown in Table VI.

Table VI

| | Adhesion, lbs. | Adhesive Pickup, Percent |
|---|---|---|
| Treated fabric | 31 | 2.0 |
| Treated yarn woven into fabric | 33 | 2.0 |

EXAMPLE VII

This example shows the effect of varying the concentration of water soluble, organic polymer in the aqueous dispersion. Following the procedure given in Example VI. Sections of fabric were dipped in aqueous dispersions containing 2% of adduct A and CMC in the amounts shown below. The tests were repeated with 0.4% latex C added in each case. Adhesion values determined as described in Example I, are shown in Table VII. When concentrations of CMC above 0.1% were employed, enough CMC was added prior to grinding to give a concentration of 0.1% and the remainder added after completion of the grinding.

Table VII

| Percent CMC | Percent Latex | Adhesion, lbs. |
|---|---|---|
| 0.01 | 0.0 | 17 |
| 0.01 | 0.4 | 29 |
| 0.02 | 0.0 | 17 |
| 0.02 | 0.4 | 30 |
| 0.04 | 0.0 | 18 |
| 0.04 | 0.4 | 35 |
| 0.50 | 0.0 | 22 |
| 0.50 | 0.4 | 31 |
| 1.0 | 0.0 | 10 |
| 1.0 | 0.4 | 20 |

EXAMPLE VIII

The example shows the effect of varying the concentration of latex in the adhesive formulation. Following the procedure of Example VI, sections of fabric were dipped in aqueous dispersions containing 2% of adduct A, 0.1% CMC and latex B in the amounts shown below. Adhesion values at the various latex concentrations, determined as described in Example I, are given in Table VIII below.

Table VIII

| Percent Latex Solids | Adhesion, lbs. |
|---|---|
| 0.2 | 31 |
| 0.4 | 37 |
| 2.0 | 28 |
| 3.0 | 38 |
| 4.0 | 41 |

EXAMPLE IX

This example shows the effect of using varying concentrations of isocyanate adduct. Following the procedure of Example VI, sections of fabric were dipped in aqueous dispersions containing adduct A and CMC in the amounts indicated below. The CMC was added as described in Example I. The tests were repeated with 0.4% latex C added. Adhesion values, determined as described in Example I are given in Table IX below.

---
[1] Trade name of B. F. Goodrich Chemical Company.

Table IX

| | Adhesion, lbs. |
|---|---|
| 0.5% Adduct A+0.025% CMC | 15 |
| 0.5% Adduct A+0.025% CMC+0.4% Latex C | 24 |
| 7.0% Adduct A+0.3% CMC | 17 |
| 7.0% Adduct A+0.3% CMC+0.4% Latex C | 32 |

EXAMPLE X

This example illustrates the advantages to be gained by using the adhesive coated yarns of this invention in combination with a resin-latex dip of the type commonly used in the industry for the dipping of fabrics to be used in conveyor belts.

Aqueous dispersions containing 2.0% isocyanate adduct, 0.1% CMC and 0.4% latex B solids were prepared as described in Example II. This dispersion was applied to yarn and the yarn woven into fabric as described in Example I. Part of the fabric was dipped in a resorcinol-formaldehyde-latex (RFL) dip for two minutes, then removed, allowed to drain and dried in an oven for one hour at 100° C. Adhesion tests were made on both the dipped and undipped fabric as described in Example I. For comparison, fabric woven from untreated yarn was dipped in the RFL solution and tested in a similar manner. The results of these tests are given in Table X below.

The RFL dip was prepared by adding 2000 ml. of a resin-forming solution, consisting of 1728 ml. of water, 68 grams of resorcinol, 144 ml. of 40% formaldehyde and 60 ml. of 10% sodium hydroxide, to 2000 ml. of latex solution consisting of 100 ml. of natural rubber latex containing 60% solids, 940 ml. of water and 60 ml. of 10% sodium hydroxide.

Table X

| | Adhesion, lbs. | |
|---|---|---|
| | Dry | Wet |
| Adduct A and RFL | 48 | 39 |
| Adduct C and RFL | 27 | 28 |
| Average | 38 | 34 |
| Adduct A Alone | 32 | 22 |
| Adduct C Alone | 23 | 21 |
| Average | 28 | 22 |
| RFL Alone | 28 | 15 |

The foregoing examples illustrate the advantages of the process of this invention wherein improved adhesive coated cellulosic structures are produced with aqueous dispersions containing relatively low concentrations of active ingredients. The adhesive coating may be applied to the yarn before weaving or twisting or to fabric or twisted structures such as tire cords or to staple fiber, or paper or non-woven webs or films.

An additional advantage of the product of this invention is the high level of adhesion which is retained in reinforced products when wet. This is particularly important in conveyor belts which are frequently used to transport wet materials.

As mentioned previously, the adhesive coated yarns of this invention may be used to advantage in fabrics or other structures which are subsequently coated with one of the commercially used resin-latex dips such as the resorcinol-formaldehyde-latex dip described in Example X. Structures coated with this combination of adhesives are disclosed and claimed in copending U. S. application of Thomas B. Gage, Serial No. 694,724, filed concurrently herewith.

The presence of a water-soluble organic polymer in the aqueous coating composition is essential. The preferred polymers are salts of acid containing polysaccharides, particularly sodium carboxymethylcellulose since this material serves to produce a more stable dispersion and gives generally higher adhesion values than other water-soluble organic polymers. Other water-soluble polymers which may be used include a water-soluble salt of alginic acid, such as sodium alginate, gum tragacanth, polyacrylamide, polyvinyl alcohol, diethylaminoethyl methacrylate polymer, sodium cellulose sulfate, sodium polyacrylate and sodium pectate. Preferably at least about 0.04% of the water-soluble polymer is used in the aqueous dispersion. Although as little as 0.01% will give good adhesion, with less than 0.04% the dispersions tend to be unstable. The maximum concentration tolerable will depend upon the polymer selected, the processing conditions employed and the end use into which the coated structure is to be put. However, in general concentrations above 0.5% are not required, the preferred range being 0.04 to 0.5%. The organic polymer selected need not be infinitely soluble to be effective since only a moderate solubility suffices to give a suitable dispersion.

The isocyanate adducts which are effective in this invention are those compounds having the general formula $R(NHCOOC_6H_5)_n$, and are reaction products of a polyisocyanate, $R(NCO)_n$, and phenol, wherein R is aliphatic, substituted aliphatic, aromatic and substituted aromatic and $n$ is at least 2.

The number of $NHCOOC_6H_5$ groups in the isocyanate adduct is preferably two but satisfactory results may be obtained when a larger number are present. Among the polyisocyanates which are suitable for preparing the adducts of this invention are diphenylmethane-4,4'-diisocyanate, hexamethylene diisocyanate, toluene diisocyanate, benzene diisocyanate, naphthalene diisocyante, cyclohexyl diisocyanate and triphenylmethane triisocyanate.

The preferred adduct is the bisphenol adduct of diphenyl methane-4,4'-diisocyanate. Although the other adducts of this invention give satisfactory dry adhesion and yield products which show little loss in adhesion on wetting, the diphenylmethane-4,4'-diisocyanate adduct gives a generally higher level of adhesion and is particularly useful in combination with a resin-latex dip.

For effective results the isocyanate adduct must be finely divided. This may be accomplished by a prolonged ball-milling of the solid material; however, the preferred procedure is to grind the adduct in sand according to the process of Hochberg U.S. 2,581,414. In grinding the adduct, it is desirable that a small amount of the water-soluble organic polymer be present. Large amounts are undesirable, however, and the amount added at this point is preferably about 5% of the weight of isocyanate adduct added. Additional amounts of the water-insoluble polymer may be added after grinding is complete, if desired.

For effective results at least about 0.1% of the adduct should be used in the aqueous dispersion and preferably at least about 0.5% or more is employed. Amounts in excess of about 2% are generally not required in the treatment of dry materials and, although not harmful otherwise, are avoided for reasons of economy. However, if wet cellulosic structures are to be treated, higher concentrations, up to 7% or more, may be desirable.

In commercial practice the adhesive coated structures of this invention will be dried to a moisture level below 10%, but in contact with air during storage will regain moisture to a level of 10% to 15% of the weight of dry cellulosic structures. Before bonding to rubber or other material, however, the coated structures may be dried to a low moisture content, preferably below 3%.

Although adhesive compositions containing only the adduct and organic water-soluble polymer give satisfactory adhesion and may be preferred in certain end uses where latex would be undesirable, the addition of rubber latex is usually preferred. The latex may be natural rubber latex or a synthetic latex, such as the conjugated diene, conjugated diene/styrene, and conjugated diene/styrene/vinylpyridine polymers described in the examples; however, it is preferable to use a synthetic latex of the type containing copolymers of butadiene and styrene. A third constituent such as vinyl pyridine or acrylonitrile may also be present. The latexes employed in the process of this invention are commercial formulations which usually contain antioxidants and other minor ingredients. In some end uses latex concentrations as high as 10–15%, based on the solids content of the latex, may be useful, however, it is preferable to use concentrations no greater than about 2%, particularly where the yarn is treated before weaving into a fabric since the higher concentrations yield tacky yarns which are difficult to weave.

The adhesive coated products of this invention are useful in the reinforcing of rubber products such as conveyor, transmission or V belts, automobile and bicycle tires, braided and woven hose, neoprene and vinyl coated fabrics, etc. They are also useful in the reinforcement of paper, plastics, banding tape, plastic laminates and caulking compound.

While it is preferable to use a regenerated cellulose in preparing the products of this invention, natural cellulose such as cotton fibers, yarns, cords and fabrics and cellulose pulp products such as paper and film may be used. Likewise cellulose derivates having a substantial number of unreacted hydroxyl groups, such as commercial cellulose acetate, may be used.

It will be apparent that many widely different embodiments of this invention may be made without departing from the spirit and scope thereof, and therefore it is not intended to be limited except as indicated in the appended claims.

I claim:

1. The process of preparing a coated shaped cellulosic structure which comprises applying to the said cellulosic structure an aqueous dispersion containing at least about 0.01% of a water-soluble organic polymer selected from the group consisting of sodium carboxymethyl cellulose, sodium alginate, polyacrylamide, poly(diethylaminoethyl)methacrylate, sodium cellulose sulfate, sodium polyacrylate, gum tragacanth, polyvinyl alcohol, and sodium pectate, and from about 0.1% to about 7% by weight based on the total weight of the dispersion of an adduct reaction product, $R(HCOOC_6H_5)_n$, of a polyisocyanate, $R(NCO)_n$, and phenol, wherein R is an organic radical selected from the group consisting of aliphatic, substituted aliphatic, aromatic, and substituted aromatic radicals, and $n$ is an integer from 2 to 3; and thereafter drying the resulting coated structure.

2. The process of claim 1 in which the cellulosic structure is regenerated cellulose.

3. The process of claim 1 in which the cellulosic structure is cotton.

4. The process of claim 1 in which the coated cellulosic structure is woven into a fabric.

5. The process of claim 1 in which the water-soluble organic polymer is sodium carboxymethyl cellulose.

6. The process of claim 1 in which the reaction product adduct is the bis-phenyl urethane of diphenyl-methane-4,4'-diisocyanate.

7. The process of claim 1 in which the reaction product adduct is the phenol adduct of hexamethylene diisocyanate.

8. The process of claim 1 in which the reaction product adduct is the phenyl urethane of toluene diisocyanate.

9. The process of claim 1 in which the said adduct reaction product is present in the amount of from about 0.5% to 2% by weight based on the total weight of the dispersion.

10. The process of claim 1 in which the water-soluble organic polymer is present in the amount of from about 0.04% to 0.5% by weight based on the total weight of the dispersion.

11. The process of claim 1 in which the dispersion also contains up to about 15% of a rubber latex selected from the group consisting of natural rubber and synthetic rubbers and conjugated dienes.

12. The process of claim 11 in which the rubber latex contains a butadiene/vinylpyridine/styrene copolymer.

13. An adhesive composition comprising an aqueous dispersion containing at least about 0.01% of a water-soluble organic polymer selected from the group consisting of sodium carboxymethyl cellulose, sodium alginate, polyacrylamide, poly(diethylaminoethyl)methacrylate, sodium cellulose sulfate, sodium polyacrylate, gum tragacanth, polyvinyl alcohol, and sodium pectate, and from about 0.1% to about 7% by weight based on the total weight of the dispersion of an adduct reaction product, $R(NHCOOC_6H_5)_n$, of a polyisocyanate, $R(NCO)_n$, and phenol, wherein R is an organic radical selected from the group consisting of aliphatic, substituted aliphatic, aromatic, and substituted aromatic radicals, and $n$ is an integer from 2 to 3.

14. A shaped cellulosic structure coated with the adhesive composition of claim 13.

15. The adhesive coated structure of claim 14 in which the moisture content is less than about 15%.

16. An adhesive coated cellulosic structure, said structure being coated with an adhesive composition comprising an aqueous dispersion containing at least about 0.01% of a water-soluble organic polymer selected from the group consisting of sodium carboxymethyl cellulose, sodium alginate, polyacrylamide, poly(diethylaminoethyl)methacrylate, sodium cellulose sulfate, sodium polyacrylate, gum tragacanth, polyvinyl alcohol, and sodium pectate, up to about 15% of a rubber latex selected from the group consisting of natural rubber and synthetic rubbers of conjugated dienes, and from about 0.1% to about 7% by weight based on the total weight of the dispersion of an adduct reaction product, $R(NHCOOC_6H_5)_n$, of a polyisocyanate, $R(NCO)_n$, and phenol, wherein R is an organic radical selected from the group consisting of aliphatic, substituted aliphatic, aromatic, and substituted aromatic radicals, and $n$ is an integer from 2 to 3, said coated structure being dried to provide a moisture content of less than about 15%.

References Cited in the file of this patent

UNITED STATES PATENTS

| | | |
|---|---|---|
| 2,128,229 | Charch et al. | Aug. 30, 1938 |
| 2,291,700 | Dreyfus | Aug. 4, 1942 |
| 2,532,011 | Dahlquist et al. | Nov. 28, 1950 |
| 2,801,990 | Seeger et al. | Aug. 6, 1957 |
| 2,826,526 | Meyrick et al. | Mar. 11, 1958 |
| 2,901,448 | Kraus | Aug. 25, 1959 |

FOREIGN PATENTS

| | | |
|---|---|---|
| 1,108,785 | France | Sept. 14, 1955 |

OTHER REFERENCES

Bayer: "Polyurethanes," Modern Plastics, June 1947, pages 149–52 and 250.

Ott and Spurlin: "High Polymers," volume 5, 2nd edition, "Cellulose," part II, published by Interscience Publishers Inc., New York, 1954, page 1020.